United States Patent
Gardner et al.

(10) Patent No.: US 10,951,761 B1
(45) Date of Patent: Mar. 16, 2021

(54) SYSTEM AND METHOD FOR LIVE AND VIRTUAL SUPPORT INTERACTION

(71) Applicant: Wells Fargo Bank, N.A., San Francisco, CA (US)

(72) Inventors: Joel Scott Gardner, Charlotte, NC (US); Daniel S. Sumner, Matthews, NC (US); Patrick Austin Boger, Clover, SC (US); H. Brock Kolls, Alpharetta, GA (US); Daniel Sanford, Charlotte, NC (US); Kyle Patrick Mitchell, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 163 days.

(21) Appl. No.: 16/214,712

(22) Filed: Dec. 10, 2018

Related U.S. Application Data

(60) Provisional application No. 62/608,282, filed on Dec. 20, 2017.

(51) Int. Cl.
*H04M 3/51* (2006.01)
*H04M 3/523* (2006.01)
(Continued)

(52) U.S. Cl.
CPC .......... *H04M 3/5183* (2013.01); *G06N 20/00* (2019.01); *G10L 15/22* (2013.01); *G10L 25/63* (2013.01)

(58) Field of Classification Search
CPC ................................ H04M 3/51; H04M 3/523
(Continued)

(56) References Cited

U.S. PATENT DOCUMENTS 7,542,902 B2    6/2009    Scahill et al.
7,724,889 B2    5/2010    Bushey et al.
(Continued)

FOREIGN PATENT DOCUMENTS

WO    WO-0209399 A2    1/2002

OTHER PUBLICATIONS

"AI for customer care: Human assisted virtual agents get smart with big knowledge", Nuance.com, [Online]. [Accessed May 12, 2017]. Retrieved from the Internet: <URL: http://whatsnext.nuance.com/in-the-labs/human-assisted-virtual-agents-machine-learning-improve-customer-experience/>, (May 11, 2016), 4 pgs.

*Primary Examiner* — Harry S Hong
(74) *Attorney, Agent, or Firm* — Schwegman Lundberg & Woessner, P.A.

(57) ABSTRACT

Disclosed herein is a computer-implemented method and related system for operating a virtual computer assistant (VCA) system of a service provider system. The method includes activating a switch to connect a communication link of the system from a human assistant (HA) to a customer and conveying first communications over the communication link to the customer from the HA. The method automatically detects a switching event according to a switching rule stored in a switch rules database stored in a memory of the system while the communication link to the HA is active. The method activates the switch to connect the communication link from the customer to a VCA after the conveying of the first communications, and then conveys second communications over the communication link to the customer from the VCA.

15 Claims, 4 Drawing Sheets

(51) Int. Cl.
*G10L 15/22* (2006.01)
*G10L 25/63* (2013.01)
*G06N 20/00* (2019.01)

(58) Field of Classification Search
USPC ........................................ 379/265.06, 265.07
See application file for complete search history.

(56) References Cited

U.S. PATENT DOCUMENTS

| | | |
|---|---|---|
| 7,762,665 B2 | 7/2010 | Vertegaal et al. |
| 7,983,411 B2 | 7/2011 | Huet et al. |
| 8,279,779 B2 | 10/2012 | Singh et al. |
| 8,636,515 B2 | 1/2014 | Burgin et al. |
| 8,793,581 B2 | 7/2014 | Sirstins et al. |
| 9,386,152 B2 | 7/2016 | Riahi et al. |
| 9,424,248 B2 | 8/2016 | Fitterer et al. |
| 9,471,638 B2 | 10/2016 | Roytman et al. |
| 9,559,993 B2 | 1/2017 | Palakovich et al. |
| 2010/0076843 A1 | 3/2010 | Ashton |
| 2010/0278318 A1* | 11/2010 | Flockhart ............... H04M 3/51 379/88.04 |
| 2013/0077775 A1* | 3/2013 | Fan .................... H04M 3/5166 379/265.09 |
| 2013/0346886 A1* | 12/2013 | Cauchois .............. H04L 51/046 715/758 |
| 2016/0071517 A1 | 3/2016 | Beaver et al. |
| 2016/0308799 A1 | 10/2016 | Schubert et al. |
| 2019/0057698 A1* | 2/2019 | Raanani ................. G06F 3/167 |

* cited by examiner

SYSTEM AND METHOD FOR LIVE AND VIRTUAL SUPPORT INTERACTION

PRIORITY CLAIM

This patent application claims the benefit of priority, under 35 U.S.C. Section 119 to U.S. Provisional Patent Application Ser. No. 62/608,282, entitled "System and Method for Live and Virtual Support Interaction," filed on Dec. 20, 2017, which is hereby incorporated by reference herein in its entirety.

TECHNICAL FIELD

Described herein is a computer-based system that may enable providing either a human assistant or a virtual computer assistant to a customer.

BACKGROUND

Many service providers provide customer service communications to their customers using both human assistants (HAs) and virtual computer assistants (VCAs) during an interaction. For these service providers, the mechanisms for switching between HAs and VCAs are generally manually initiated and do not provide for sophisticated automated switching according to a sophisticated set of switching rules.

SUMMARY

Disclosed herein is a computer-implemented method for operating a virtual computer assistant (VCA) system of a service provider system. The method includes activating a switch to connect a communication link of the system from a human assistant (HA) to a customer and conveying first communications over the communication link to the customer from the HA. The method automatically detects a switching event according to a switching rule stored in a switch rules database stored in a memory of the system while the communication link to the HA is active. The method activates the switch to connect the communication link from the customer to a VCA after the conveying of the first communications, and then conveys second communications over the communication link to the customer from the VCA.

Disclosed herein is also a virtual computer assistant (VCA) system having a VCA that is an automated support system to interact with a user. The system has a switch comprising a user link connection that is connected to a user communications interface of the user, a controller connection that is connected to a controller that is to control operation of the switch, a human assistant (HA) connection that is connected to an HA communications interface of a human assistant, and a VCA connection that is connected to a VCA communications interface of the VCA. The system further has a switch rules database stored in the memory. The database comprises switch instructions to operate the switch. The controller is connected to the switch rules database, and utilizes the switch instructions to operate the switch in order to connect the user link connection to the VCA connection when the instructions indicate a connection to the VCA connection, and connect the user link connection to the HA connection when the instructions indicate a connection to the HA connection.

Disclosed herein is also a non-transitory computer-readable storage medium, the computer-readable storage medium including instructions that when executed by a processor, cause the processor to execute the method described above.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Described below is a service provider system that deals with a relationship and interactions between a customer, a human assistant, and a virtual computer assistant (VCA) in order to provide an enhanced customer experience. The system is capable of switching a connected customer between a human assistant and a VCA and vice versa. The human assistant may be supported by the VCA as well. The VCA may utilize known customer information to optimize the interaction, and may be able to understand the context of the interaction based on questions, environment, historical interactions, and recent transactions. The system may make use of artificial intelligence (AI), configurable rules, and other mechanisms to move the VCA into and out of the conversation, and it can alert the human assistant if a response it cannot provide is required. In this way, the VCA may be efficiently used in the proper situation, but a human is used if the customer experience would benefit from it.

Figure 1:
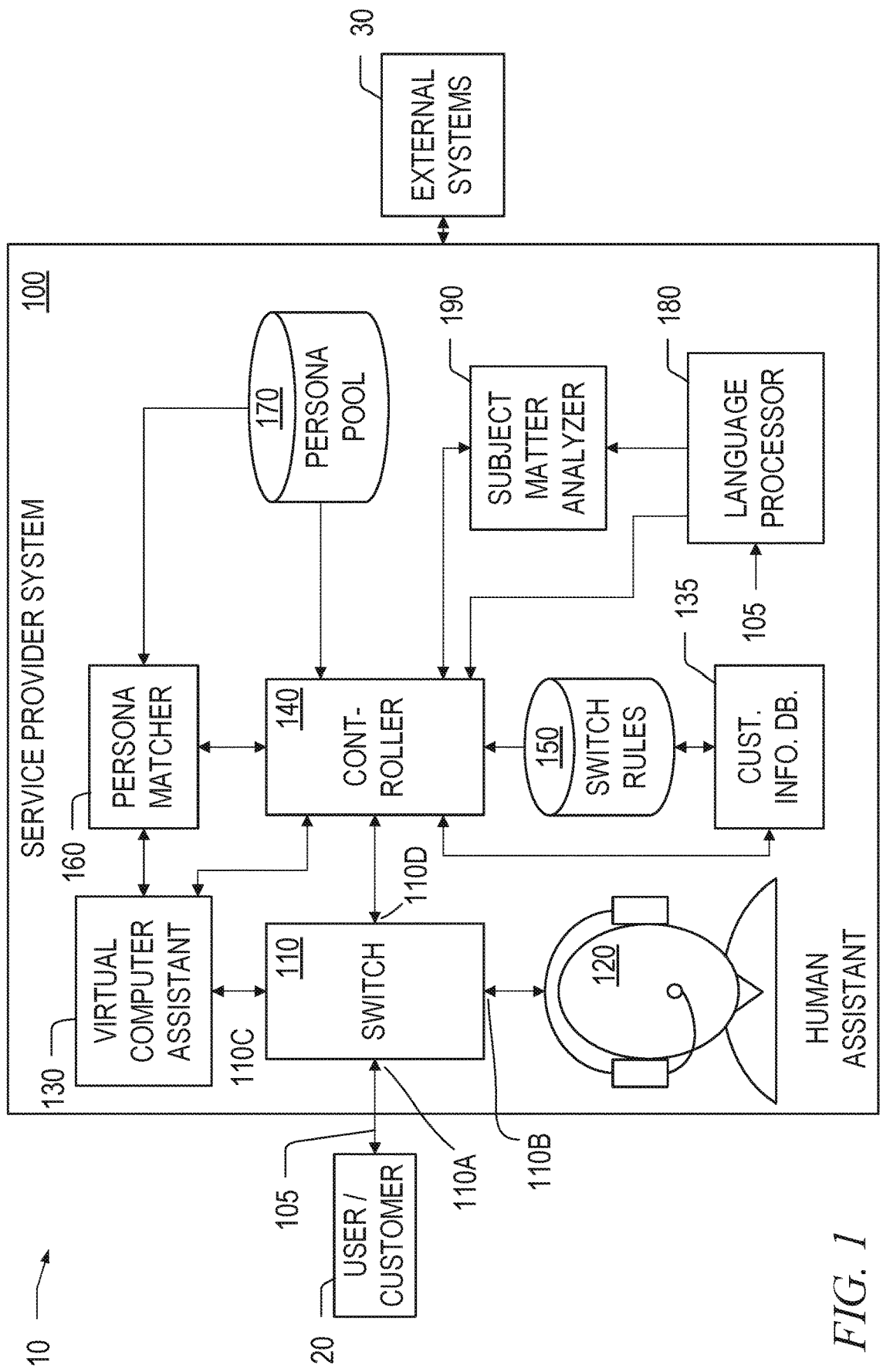
FIG. 1 is a block diagram illustrating an environment within which one implementation of a service provider system described herein may operate.

FIG. 1 is a block diagram illustrating an environment 10 within which one implementation of a service provider system 100 described herein may operate. A user 20 of the service provider system 100 may be, for example, a customer who has a relationship with the service provider. The user/customer 20 may be connected to the service provider system 100 via a user link (or user communications interface) 105, such as a telephone link (for example, a plain old telephone service (POTS), Integrated Services Digital Network (IDSN), Fiber Distributed Data Interface (FDDI)), a cellular network link (including: Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN)), or any other form of network link.

The customer 20 may either be connected to a human assistant 120 (or human advisor) or to a VCA 130 (or bot) via a switch 110. The switch may comprise a user link connection 110A, a human assistant connection 110B, a VCA connection 110C, and a controller connection 110D. The human assistant 120 may be, for example, a customer service representative who communicates with the customer 20 via a telephone, audio, or audio-visual connection. Alternately, or additionally, the human assistant 120 may digitally communicate with the customer 20 via, for example, a chat function, SMS, email, and the like. The VCA 130 may utilize known computer voice/speech synthesis techniques when producing voice conversation with the customer 20, or may utilize known natural language generation techniques when producing text or digital conversation with the customer 20.

The service provider system may also comprise a customer information database 135 that is accessible by the human assistant 120 and the VCA. The system may leverage customer specific or segmentation based attributes to customize the desired interaction experience. For example, some customers may qualify for only VCA interactions while others may qualify for interactions managed through the Human Assistant. Although a connecting line is not shown in the drawings, there may be a connection between the human assistant 120 and the VCA 130 so that the human assistant 120 is supported by the VCA 130. By way of example, if a customer 20 makes an inquiry about the status of one of her accounts, the human assistant 120 may look up the information related to the account directly from the customer information database 135, or the human assistant 120 may utilize the VCA 130 to access the information related to the account, in which case the VCA 130 and/or controller 140 may be able to further process the information so that it can be more effectively utilized. In another implementation, the customer 20 can directly inquire about the status of her account to the VCA 130.

The switch 110 and supporting components may be utilized to determine when to connect the customer 20 to the human assistant 120 and when to connect the customer to the VCA 130. A controller 140 may utilize a switch rules database 150 that comprises various criteria usable to determine whether the customer 20 will be connected to the human assistant 120 or the VCA 130. Physically, a control signal may be passed from the controller 140 to the switch 110 via the controller connection 110D, which causes the user link 105 to be connected to the human assistant connection 110B or to the VCA connection 110C and thereby passing communication signals between the customer 20 and the human assistant 120 or the VCA 130, respectively.

The controller 140 may utilize artificial intelligence (AI) techniques, including machine/deep learning algorithms in combination with the switch rules database 150 to determine whether to control the switch 110 to switch from the human assistant 120 to the VCA 130 and vice versa, and also alert the human assistant 120 when the VCA 130 cannot provide a proper response.

In addition, the controller may access a persona matcher 160 that matches various persona, persona factors, or persona characteristics available in a persona pool 170 to either match the persona of the human assistant 120 and/or a persona that may be suited for interacting with a particular customer 20 according to predefined persona criteria. Such a match may be made by attempting to pair the customer 20 with a persona that they feel the most comfortable with, either by trying to match voice and dialect characteristics with the customer 20 or by allowing the customer to choose, for example during an on-line web-based registration process, a persona or characteristics of a persona that they might prefer. Another example may be segmentation based matching of personas. For example—millennials might interact best with a casual assistant persona while a wealth client might interact more effectively with a mature financial advisor persona. Gender matching may also be used to pair male or female personas with appropriate customers. A persona that is utilized for the VCA 130 at a particular time may be designated as a current persona.

The customer's 20 voice or communications may be provided to a voice and/or language processor 180 that may be used to analyze the communications at a higher level and produce processed communications. An output of the voice and/or language processor 180 may be provided to a subject matter analyzer 190 that may determine the nature of a subject matter, which may include a user request or context of an interaction with the customer. The subject matter may be determined based on the type of questions asked, the environment or location of the customer 20, and historical/recent interactions with the customer 20 accessed via the customer information database 135. Although interactions with the current customer 20 are likely to provide the more relevant information for determining the request or context, it is also possible for the subject matter analyzer 190 to utilize historical data from other customers in order to make the subject matter, request, or context determination.

The request or context of the subject matter analyzer 190 may be provided to the controller 140 that may change the persona to accommodate a particular type of request or context. Furthermore, in the implementation in which the VCA 130 supports the human assistant 120, the VCA 130 may un in the foreground and/or the background, and based on the subject matter analyzer 190, the VCA 130 may recognize the context of the interaction and provide useful information to the human assistant 120 based on that context. Similarly, the persona matcher 160 may modify the persona based on a detected situation of the customer 20. For example, if it is detected that the customer 20 is located in their car (e.g., by using a location detector such as a GPS, a cell phone use detector, or an environment detector such as a microphone that can detect the presence of particular environmental noises, such as the presence of road noise), the persona might keep the conversation tight, simple, and quick. In contrast, if it is detected that the customer is in their home, then the persona might converse in a more flowing and detailed manner.

In sum, a wide variety of factors may be drawn upon by the persona matcher 160 to consider use of a persona or persona components that are stored in the persona pool 170. These may include: customer voice tone, word choice, speed of communications (speaking speed), topical/ntent, value of money at stake, location (e.g., home, on the road) regional dialect/accent, emotional expression, language (English, Spanish, Chinese, etc.), slang, and customer segmentation. the persona matcher may use further predefined persona criteria (which may be the same as the predefined persona criteria) to continually change the persona or one of its factors throughout the conversation with the customer 20.

The service provider system 100 may additionally access external systems 30 to obtain information that may be helpful to the customer, such as the collection of available loan rates, mutual fund share values, external database information, social media information, news, national/local stores/discounts, local events, volunteer/charitable activity, and weather.

The system 100 may consider customer historical patterns to determine how a current interaction may take place, and the switch rules 150 may determine whether to start with the human assistant 120 or the VCA 130 when a connection between the customer 20 and the service provider system 100 is initiated. By way of example, if this is the very first interaction that the customer 20 is having with the service provider system 100, a rule may indicate that the human assistant 120 may be best able to collect the initial starting information and establish a rapport with the customer, and also possibly providing some form of introductory information related to use of the VCA 130. Subsequent interactions with the customer 20 may then begin with the VCA 130. However, particular customers 20 may always be directed to the human assistant 120 first, such as a customer who frequently complains or who tends to be excitable (e.g., based on a question asked by the customer 20 or past interactions).

In one implementation, according to a use case, a customer 20 contacts the service provider system 100 using a telephone. A language processor 180 may comprise tools for language recognition to be able to intelligently interpret the language being used in the communication. The language recognition may include a text processor or a voice recognition processor to accurately interpret the contents of the message. The language processor 180 receives and interprets the initial communication from the customer 20 (e.g., via the user link 105) (which may be based on an initial VCA 130 or human assistant 120 communication) and sends this information that may include identity information (obtainable from the customer or in some automated manner) and information related to the customer's 20 state, such as vocal tone, vocal characteristics, and words, to the controller 140. The subject matter analyzer 190 may receive information from the voice and language processor 180 relative to the nature of the request.

In the example use case, the controller 140 may determine that this is an established customer by locating the customer record in the customer information database 135, and, by looking to the switch rules 150, that absent any detected tension or stress in the customer's 20 voice, it is acceptable to begin the substance of the conversation with the VCA 130. In a different situation in which this is not an established customer (e.g., by being unable to locate the customer record), the switch rules 150 may indicate that the substance of the conversation begin with a human assistant 120 initially.

In the present use case, the language processor 180 is able to detect a level of stress in the customer's 20 voice based on a slightly higher pitch and use of two key words "lost" and "stolen". The controller 140, looking to the switch rules 150, determines that based on a detected stress level, the customer 20 should speak to the human assistant 120 initially for the substantive communications. The controller 140 may use various methods to detect stress or other emotions in the customer's 20 voice, for example, a weighted factor analysis or other multi-variable technique used by an emotion detection analyzer. If an emotion of interest meets a threshold value according to the emotion detection analyzer, particular switch rules 150 may be implemented. The switch rules 150 may be threshold based, sum based, or use any type of mathematical formulaic or computer logic based approach for implementation.

Returning to the present use case, the controller 140 connects the customer 20 to the human assistant 120 using the switch 110, and the human assistant 120 gathers additional information in a conversation with the customer 20. According to the present use case, the conversation is a voice conversation-however, the conversation could be a text conversation using messaging, email, and so on (although in a text-only situation, obviously voice pitch could not be used as a determinant of stress). Even though the human assistant 120 is connected with the customer 20, the language processor 180 and subject matter analyzer 190 may still be operating to gather information, storing it, and processing it during this conversation.

In the present use case, the human assistant 120 asks the customer 20 to describe their situation, and the customer 20 states that their wallet with all of their credit cards is missing, and they are not sure whether they lost it or it was stolen. The human assistant 120 may speak reassuringly to the customer 20 explaining that everything will be alright, and that a temporary freeze can be placed on the credit cards for forty-eight hours so that if the wallet is found within that time period, the freeze can be easily taken off.

At this point, the human assistant 120 may indicate that in order to properly place the freeze on the credit cards, the credit card numbers and other relevant account information along with verification will need to be obtained. At this point, based on conversation content or an express signal from the human assistant 120, the controller 140 may utilize the switch rules 150 to activate the switch 110 to connect the customer 20 to the VCA 130.

The subject matter analyzer 190 may recognize, based on information from the language processor 180, that the request is for a credit card freeze in a context of a loss or potential theft of the wallet and communicate this to the controller 140. It may deduce this, for example, based on keywords that are used throughout the conversation. In an alternative implementation, the human assistant 120 could expressly indicate the nature of the request to the controller.

In this context, the controller 140 may indicate the "theft or loss" context to the persona matcher 160, which may select a persona from the persona pool 170 having a calming and soothing tone and speed that may help reduce stress and tension in the customer 20. The selected persona may then be utilized by the VCA 130 to continue collecting any additional information from the customer 20 or responding to any inquiries. In one implementation, the persona matcher 160 locates a persona in the persona pool that attempts to match the human assistant 120 that had been interacting with the customer. If performed seamlessly enough, e.g., matching tone, voice characteristics, etc., the customer 20 may not even be aware that the switch has occurred, although in other implementations, the system may inform the customer 20 when such switches occur.

In one implementation, the matched persona could be a multi-component element. For example, a first component could deal with the dialect and other voice-related characteristics, whereas a second component could deal with the subject matter. In this example, the system could have the first component be switchable between a southern female using a formal English dialect and a Californian male teen using a west coast teenage dialect, and the second component could be switchable between an expert in credit card theft or loss and an expert in opening new savings accounts, with any combination of the first and second components. There could also be more than two components and the components could be mixed and matched to create an overall persona built from the persona components. There could be a large library in the persona pool 170 for both the persona components, and these could be mixed and matched in any desired manner.

In one implementation, during a conversation between the customer 20 and the VCA 130, the language processor 180 may continuously monitor the conversation and the controller 140 may continuously check the ongoing conversation against the switching rules 150. At some point, if a measured or calculated confidence level falls below a predetermined threshold according to a rule, the controller 140 may operate the switch 110 to reconnect the customer 20 to the human assistant 120. Such a switchover may occur if the system detects customer frustration or aggregation. A converse switchover from the human assistant 120 to the VCA 130 may occur when the predetermined threshold is crossed in the other direction (possibly with some hysteresis built in), for example the customer 20 has significantly calmed down and is exhibiting more peaceful characteristics. Any attribute, including content, of the conversation between the user and one of the human assistant 120 or the VCA 130 may be utilized in determining when to switch, but also an attribute of the service provider itself. For example, if there is a shortage of human assistants 120 at a particular time, the controller could use the switch rules 150 to favor use of a VCA 130.

A part of the controller's 140 decision to perform a switchover may alternately or additionally involve the subject matter associated with a current request. The subject matter analyzer 190 may continuously monitor the conversation to determine what a current request context is, since this may shift over time throughout the conversation. If the VCA 130 is better able to address a particular request than the human assistant 120, then the controller 140, using one or more of the switch rules 150, may switch the customer 20 to the VCA 130 (and vice versa).

The controller 140 and related rules 150 to not need to focus solely on switching between the human assistant 120 and the VCA 130, but can also look to switch between personas used by the VCA 130 during a conversation with the customer 20. For example, as a customer 20 changes from an upset and rushed tone to a calm and more relaxed one, the controller 140 may direct the persona matcher 160 to switch from a slow and nurturing persona to a more businesslike persona that is consistent with one historically used with that customer 20.

The controller may apply weighting on the inputs and scoring, and may apply weighted factors on the switch rules 150. One example of a possible weighting scheme might be:
High value weighting factor: relevance, customer voice tone, service center attribute (such as a number of available human assistants)
Middle value weighting factor: customer word choice
Low value weighting factor: topic, value, reflections, speed These weightings are arbitrary and could easily be modified based on an empirical analysis of collected data. If the VCA 130 encounters a difficulty, for example, a customer 20 asks a simple question—but in an esoteric manner—the VCA 130 may indicate to the customer 20 that it does not understand the context of the question. In this situation, the customer 20 may be prompted to repeat the question. After such a customer interaction, the customer 20 may be able to provide additional information to the VCA 130 so that the VCA 130 can store this information in a memory of the system and could know the answer to the question itself if asked in the future. One advantage to this approach is that there may be one human assistant 120 managing multiple conversations. If human intervention is needed 10% of the time, then one human assistant 120 may be able to manage ten conversations.

In the above use case, the customer 20 could contact the service provider system 100 through text-based communications, such as a messaging service, email, chat, etc.

In one implementation, the controller 140 may decide not only whether to operate the switch 110 to switch the customer 20 from communicating with the human assistant 120 or the VCA 130, but also to operate the switch 110 to determine the form or mode of communication (e.g., voice, text, messaging, SMS). For example, even though a customer 20 is engaged with the VCA 130 through voice, the VCA 130 may indicate that it is going to send the customer 20 some links that the customer 20 may click on to obtain additional information relevant to their query. A window containing a chat box with hypertext links may then appear on the customer's 20 device, such as a smart phone, and the user may begin interacting with the VCA 130 using digital/text modes. The controller 140 may switch the system 100 back and forth between voice communications and digital/text communications, depending on further switch rules found in the switch rules database 150.

In one example use case, a customer 20 is connected to the VCA 130 and provides their account number, but the VCA 130 does not recognize it. The VCA 130 then alerts the human assistant 120, indicating that it does not recognize the account number, and then displays the account number that it heard on a screen of the human assistant 120. The human assistant 120 may look at the account number and realize that two digits are transposed. The human assistant 120 may correct the account number and allow the VCA 130 to stay connected to the customer 20 to continue the conversation without further (and possibly without any) direct human involvement in the conversation.

It may also be possible to have different VCA 130 or controller 140 components, or bots, that focus on particular areas. For example, there may be a highly intelligent managing bot that oversees many lower-level and specific focus bots. The bots could function like apps where each bot may have a specific purpose or a narrow piece of a task or service that it does (specialization). The controller 140 may have the ability to assign the right bot as the VCA 130 or a part of the VCA 130 to interact with the customer at any particular time. The controller 140 may do this by accessing a registry that describes available bots for particular requests or situations determined from, for example, the subject matter analyzer 190. For example, the lost or stolen credit card situation could be turned over by the controller 140 to a bot that specializes in the handling of this situation, similar to the way a customer 20 may be handed off to a particular person or group depending on their current situation or request.

Figure 2:
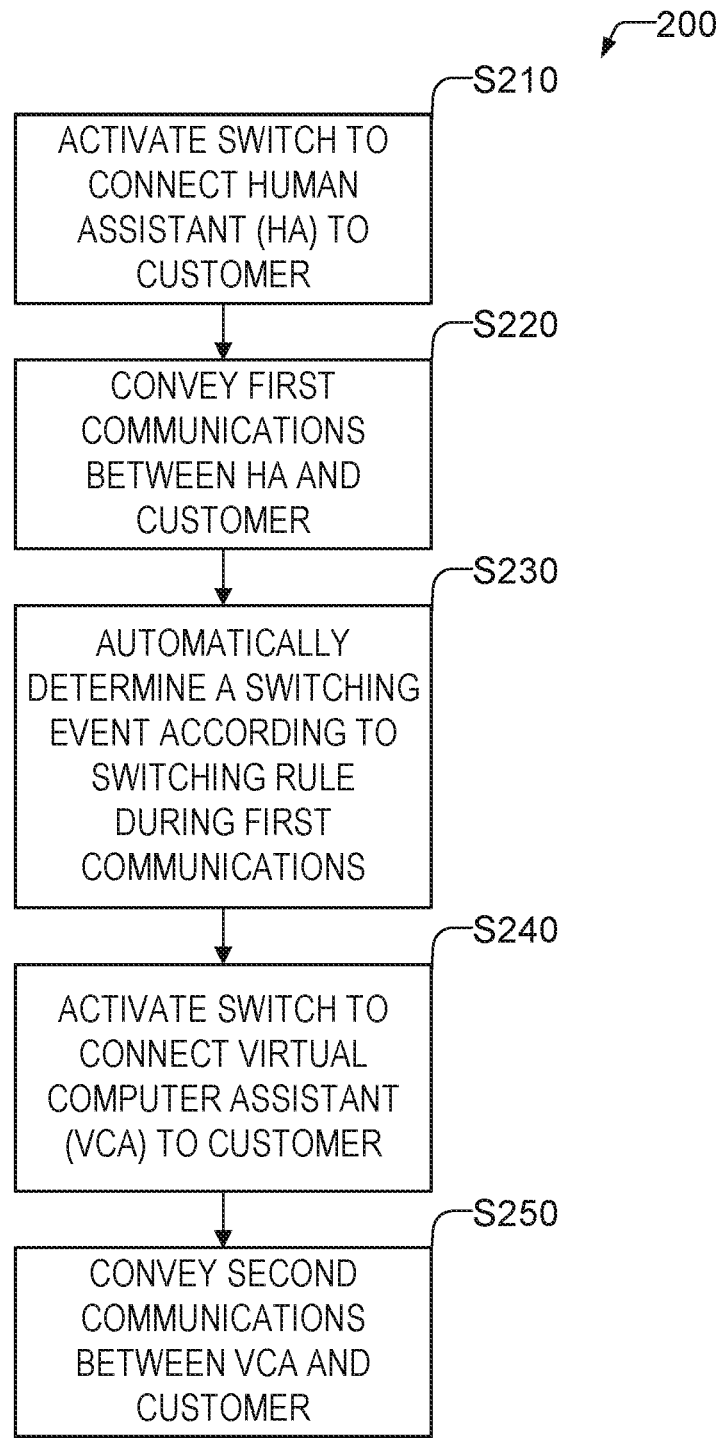
FIG. 2 is a flowchart describing an example implementation of a process that may be used in the system.

FIG. 2 is a flowchart describing an example implementation of a process 200 that may be used in the system 100. In operation S210, the switch 110 may be activated by the controller 140, according to one or more switch rules 150 as described above, in order to connect the human assistant connection 110B with the user link 105, which thereby connects the human assistant 120 to the customer 20. In operation S220, the human assistant 120 and the customer 20 utilize the user link connection 105 to engage in communications. These communications may be in a form of voice or text, and may utilize a telephone, email system, messaging system, or any combination of these. In operation S230, the controller 140 may utilize the language processor 180, the subject matter analyzer 190, information from external systems 30, or other input to automatically determine a switching event based on at least one rule within the switch rules database 150.

Once the switching event is determined, in operation S240, the controller 140 may activate the switch 110 to connect the VCA connection 110C with the user link 105, which thereby connects the VCA 130 to the customer 20. In operation S250, the VCA 130 and the customer utilize the user link connection 105 to engage in subsequent communications. These subsequent communications may also be in a form of voice or text, and may utilize a telephone, email system, messaging system, or any combination of these.

This general process may be repeated to switch the customer 20 back to the HA 120 during the course of an interaction, using rules from the switch rules 150 for determining when to switch to either the HA 120 or the VCA 130. In one implementation, switching back and forth may be repeated many times, with an aim to make the transitions from one to the other as seamless as possible on the customer 20 experience.

General Computer and Network Architecture

Figure 3:
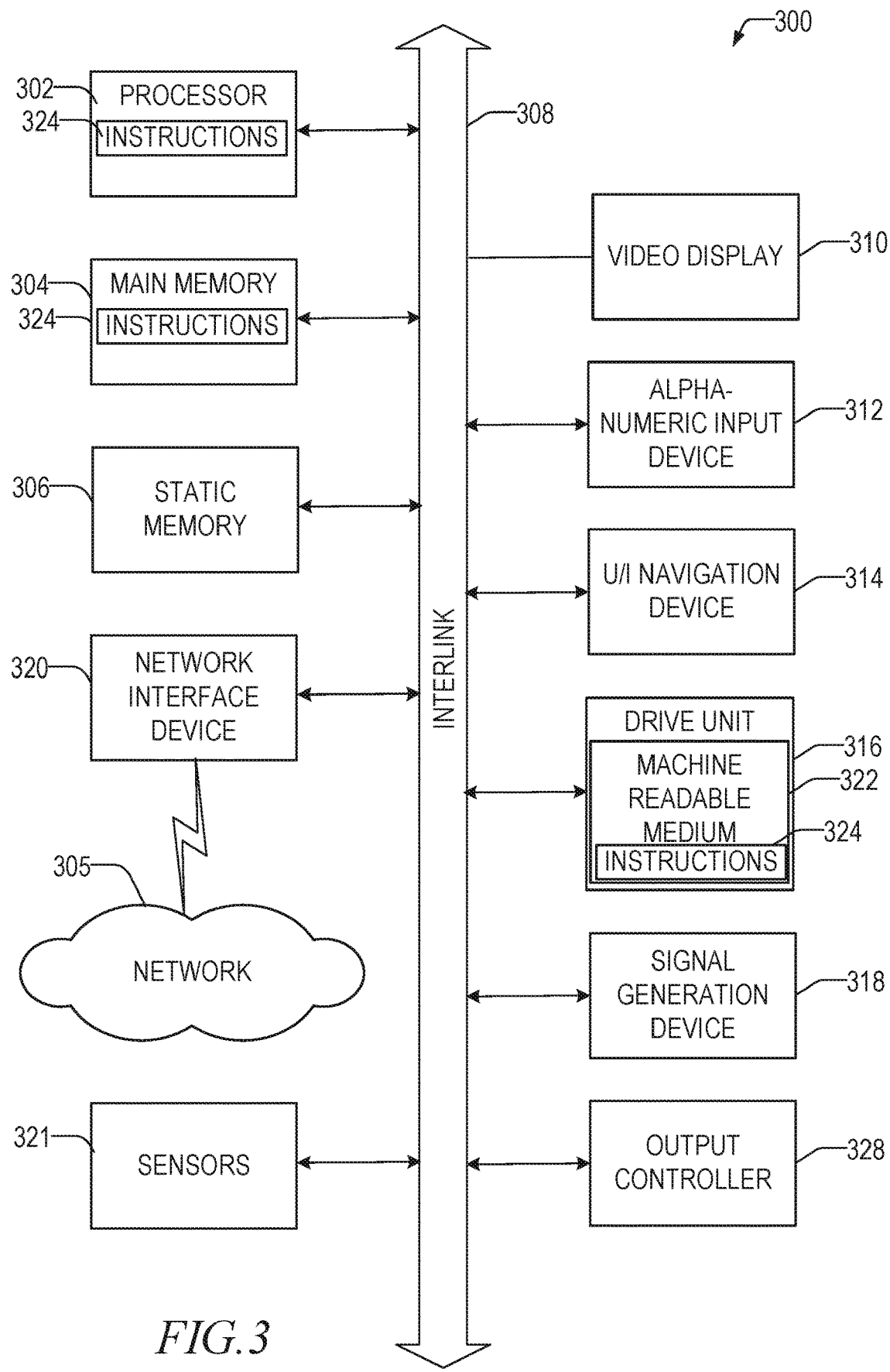
FIG. 3 is a block diagram illustrating a machine that may be a computer on which various processes described herein may be performed.

To describe some configurations in greater detail, reference is made to examples of hardware structures and interconnections usable in the designs of the present disclosure. FIG. 3 is a block diagram illustrating a machine 300 that may be a computer or computer system on which various processes described herein may be performed. The machine 300 may form various parts or all of the service provider system 100 described above. Such a machine 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a display unit 310, an alphanumeric input device 312 (e.g., a keyboard), and a user interface (UI) navigation device 314 (e.g., a mouse). In an example described herein, the display unit 310, input device 312 and UI navigation device 314 may be a touch screen display. The machine 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 may include an output controller 328, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 324 may further be transmitted or received over the communications network 305 using a transmission medium via the network interface device 320. The term "transmission medium" is defined herein to include any medium that is capable of storing, encoding, or carrying instructions for execution by the machine, and includes digital or analog communications signals or other medium to facilitate communication of such software.

The machine 300 may communicate with one or more other machines 300 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 302.11 family of standards known as Wi-Fi®, IEEE 302.16 family of standards known as WiMax®), IEEE 302.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 300. In an example, the network interface device 320 may include one or more physical jacks (e.g., Ethernet, coaxial, or phone jacks) or one or more antennas to connect to the communications network 326.

In an example, the network interface device 320 may include a plurality of antennas to wirelessly communicate using at least one of single-input multiple-output (SIMO), multiple-input multiple-output (MIMO), or multiple-input single-output (MISO) techniques. In some examples, the network interface device 320 may wirelessly communicate using Multiple User MIMO techniques.

A wide variety of computing devices may constitute a machine 300, as described herein. The following list includes a variety of devices that may fit the definition of a machine 300: a personal data assistant (PDA), a cellular telephone, including a smartphone, a tablet computing device, a laptop computer, a desktop computer, a workstation, a server computer, a mainframe computer, and the like.

Figure 4:
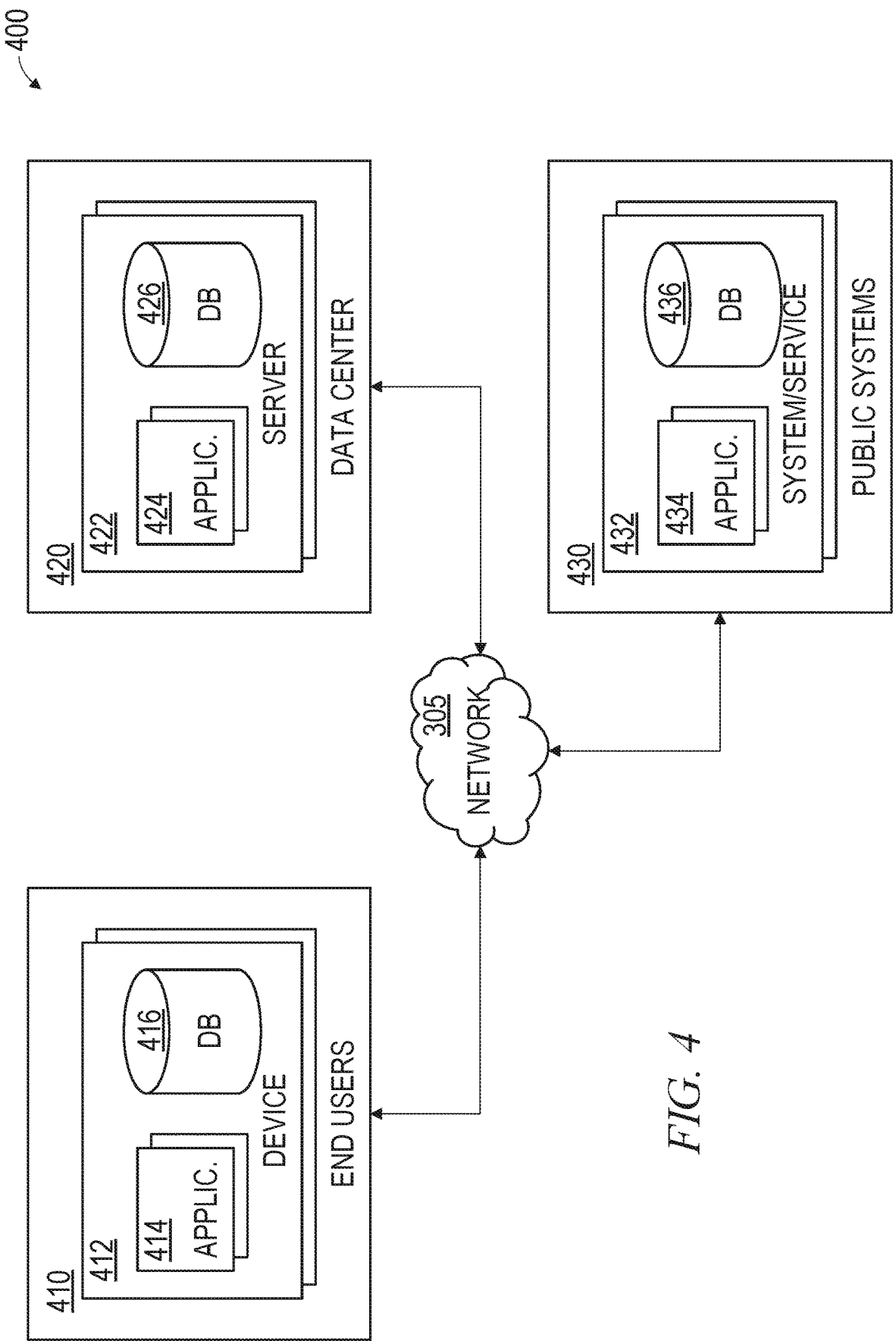
FIG. 4 is a block diagram of a distributed computing system within which various processes described herein may be performed.

FIG. 4 is a block diagram of a distributed system 400 that may include a client-server architecture or cloud computing system. The system 400 may be a system 100 as described above. Distributed system 400 may have one or more end users 410. An end user 410 may have various computing devices 412, which may be machines 300 as described above. The end-user computing devices 412 may comprise applications 414 that are either designed to execute in a stand-alone manner, or interact with other applications 414 located on the device 412 or accessible via the network 305. These devices 412 may also comprise a data store 416 that holds data locally, the data being potentially accessible by the local applications 414 or by remote applications.

The system 400 may also include one or more data centers 420. A data center 420 may be a server 422 or the like associated with a business entity that an end user 410 may interact with. The business entity may be a computer service provider, as may be the case for a cloud services provider, or it may be a consumer product or service provider, such as a retailer. The data center 420 may comprise one or more applications 424 and databases 426 that are designed to interface with the applications 414 and databases 416 of end-user devices 412. Data centers 420 may represent facilities in different geographic locations where the servers 422 may be located. Each of the servers 422 may be in the form of a machine(s) 300.

The system 400 may also include publicly available systems 430 that comprise various systems or services 432, including applications 434 and their respective databases 436. Such applications 434 may include news and other information feeds, search engines, social media applications, and the like. The systems or services 432 may be provided as comprising a machine(s) 300.

The end-user devices 412, data center servers 422, and public systems or services 432 may be configured to connect with each other via the network 305, and access to the network by machines may be made via a common connection point or different connection points, e.g. a wireless connection point and a wired connection. Any combination of common or different connections points may be present, and any combination of wired and wireless connection points may be present as well. The network 305, end users 410, data centers 420, and public systems 430 may include network hardware such as routers, switches, load balancers and/or other network devices.

Other implementations of the system 400 are also possible. For example, devices other than the client devices 412 and servers 422 shown may be included in the system 400. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 422.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the claims, along with the full scope of equivalents to which such claims are entitled.

The invention claimed is:

1. A computer-implemented method for operating a virtual computer assistant (VCA) system of a service provider system, comprising, using a processor:
   activating a switch to connect a communication link of the system from a human assistant (HA) to a customer;
   conveying first communications of a conversation over the communication link to the customer from the HA;
   automatically detecting a switching event according to a switching rule stored in a switch rules database stored in a memory of the system while the communication link to the HA is active;
   activating the switch to connect the communication link from the customer to a VCA after the conveying of the first communications;
   conveying second communications of the conversation over the communication link to the customer from the VCA;
   selecting a persona for the VCA from a pool of personas based upon a plurality of factors, the plurality of factors comprising a location of the customer, a customer voice tone, a word choice of the customer, a speed of communication of the customer, a regional dialect of the customer, or an emotional expression of the customer; the persona including at least a first component specifying voice related characteristics of the VCA and a second component specifying an area of expertise of the VCA; and
   determining, during the second communications, that at least one of the factors of the plurality of factors have changed, and in response, changing the selected persona of the VCA during the conversation.

2. The method of claim 1, further comprising, processing the first communications with a language processor to produce processed first communications, wherein the switching event is based at least in part on the processed first communications.

3. The method of claim 2, further comprising determining a subject matter from the processed first communications, wherein the switching event is based at least in part on the determined subject matter.

4. The method of claim 2, wherein the switching event is based at least in part on at least one of a tone or a speaking speed of the customer's voice in the first communications.

5. The method of claim 2, wherein the switching event is based at least in part on words used by the customer in the first communications.

6. The method of claim 1, wherein switching rules in the switch rule database comprise a plurality of weighted factors.

7. The method of claim 6, wherein one of the weighted factors is an attribute of a service provider associated with the service provider system.

8. The method of claim 1, further comprising:
   automatically detecting a further switching event according to a further switching rule stored in the switch rule database while the communication link to the VCA is active;
   activating the switch to connect the communication link from the customer to the HA after the conveying of the second communications; and
   conveying third communications over the communication link to the customer from the HA.

9. A non-transitory computer-readable storage medium, the computer-readable storage medium including instructions that when executed by a processor, cause the processor to perform operations comprising:
   activating a switch to connect a communication link of a virtual computer assistant (VCA) system from a human assistant (HA) to a customer;
   conveying first communications of a conversation over the communication link to the customer from the HA;
   automatically detecting a switching event according to a switching rule stored in a switch rules database stored in a memory of the system while the communication link to the HA is active;
   activating the switch to connect the communication link from the customer to a VCA after the conveying of the first communications;
   conveying second communications of the conversation over the communication link to the customer from the VCA;
   selecting a persona for the VCA from a pool of personas based upon a plurality of factors, the plurality of factors comprising a location of the customer, a customer voice tone, a word choice of the customer, a speed of communication of the customer, a regional dialect of the customer, or an emotional expression of the customer; the persona including at least a first component specifying voice related characteristics of the VCA and a second component specifying an area of expertise of the VCA; and
   determining, during the second communications, that at least one of the factors of the plurality of factors have changed, and in response, changing the selected persona of the VCA during the conversation.

10. The medium of claim 9, wherein the operations further comprise:
    processing the first communications with a language processor; and
    determining a subject matter from the processed first communications;
    wherein the switching event is based at least in part on at least one of:
    the processed first communications;
    the determined subject matter; or
    a tone or a speaking speed of a customer's voice in the first communications.

11. A computing device, comprising:
    a processor;
    a memory, the memory storing instructions, which when executed by the processor, causes the processor to perform operations comprising:
    activating a switch to connect a communication link of a virtual computer assistant (VCA) system from a human assistant (HA) to a customer;
    conveying first communications of a conversation over the communication link to the customer from the HA;
    automatically detecting a switching event according to a switching rule stored in a switch rules database stored in a memory of the system while the communication link to the HA is active;
    activating the switch to connect the communication link from the customer to a VCA after the conveying of the first communications;
    conveying second communications of the conversation over the communication link to the customer from the VCA;
    selecting a persona for the VCA from a pool of personas based upon a plurality of factors, the plurality of factors comprising a location of the customer, a customer voice tone, a word choice of the customer, a speed of communication of the customer, a regional dialect of the customer, or an emotional expression of the customer; the persona including at least a first component specifying voice related characteristics of the VCA and a second component specifying an area of expertise of the VCA; and
    determining, during the second communications, that at least one of the factors of the plurality of factors have changed, and in response, changing the selected persona of the VCA during the conversation.

12. The computing device of claim 11, wherein the operations further comprise processing the first communications with a language processor to produce processed first communications, wherein the switching event is based at least in part on the processed first communications.

13. The computing device of claim 12, wherein the operations further comprise determining a subject matter from the processed first communications, wherein the switching event is based at least in part on the determined subject matter.

14. The computing device of claim 12, wherein the switching event is based at least in part on at least one of a tone or a speaking speed of the customer's voice in the first communications.

15. The computing device of claim 12, wherein the switching event is based at least in part on words used by the customer in the first communications.

* * * * *